United States Patent [19]

Nash et al.

[11] Patent Number: 4,934,600
[45] Date of Patent: Jun. 19, 1990

[54] EXHAUST NOZZLE THERMAL DISTORTION CONTROL DEVICE

[75] Inventors: Dudley O. Nash, Cincinnati; Melvin Bobo, Madeira; Steven J. Croft, Cincinnati, all of Ohio

[73] Assignee: General Electric Company, Cincinnati, Ohio

[21] Appl. No.: 284,162

[22] Filed: Dec. 14, 1988

[51] Int. Cl.$^5$ .............................................. F02K 1/12
[52] U.S. Cl. ........................... 239/127.1; 239/265.37; 60/266
[58] Field of Search ............ 239/127.1, 127.3, 265.19, 239/265.33, 265.37; 60/266

[56] References Cited

U.S. PATENT DOCUMENTS

| | | | |
|---|---|---|---|
| 3,422,623 | 1/1969 | Scott | 60/266 |
| 3,575,260 | 4/1971 | Urguhart et al. | 239/127.3 |
| 4,037,405 | 7/1977 | Huenniger et al. | 239/265.37 |
| 4,098,076 | 7/1978 | Young et al. | 239/265.19 |
| 4,747,542 | 5/1988 | Cires et al. | 239/127.3 |

*Primary Examiner*—Andres Kashnikow
*Assistant Examiner*—Karen B. Merritt
*Attorney, Agent, or Firm*—Jerome C. Squillaro; Steven J. Rosen

[57] ABSTRACT

A variable area, two-dimensional nozzle for exhausting a hot stream of combustion gases from a jet engine comprising upper and lower movable exhaust flaps disposed between stationary sidewalls for defining at least a portion of the exhaust path of the nozzle, each sidewall having an inner surface and outer surface. A heat exchange baffle is disposed on the outer surface of each sidewall for heating the outer surface of the sidewall to reduce the temperature differential between the inner and outer surfaces during operation of the nozzle. Ports disposed in the sidewall are provided for directing a source of hot gas into the heat exchange baffle.

13 Claims, 3 Drawing Sheets

FIG. I.
(PRIOR ART)
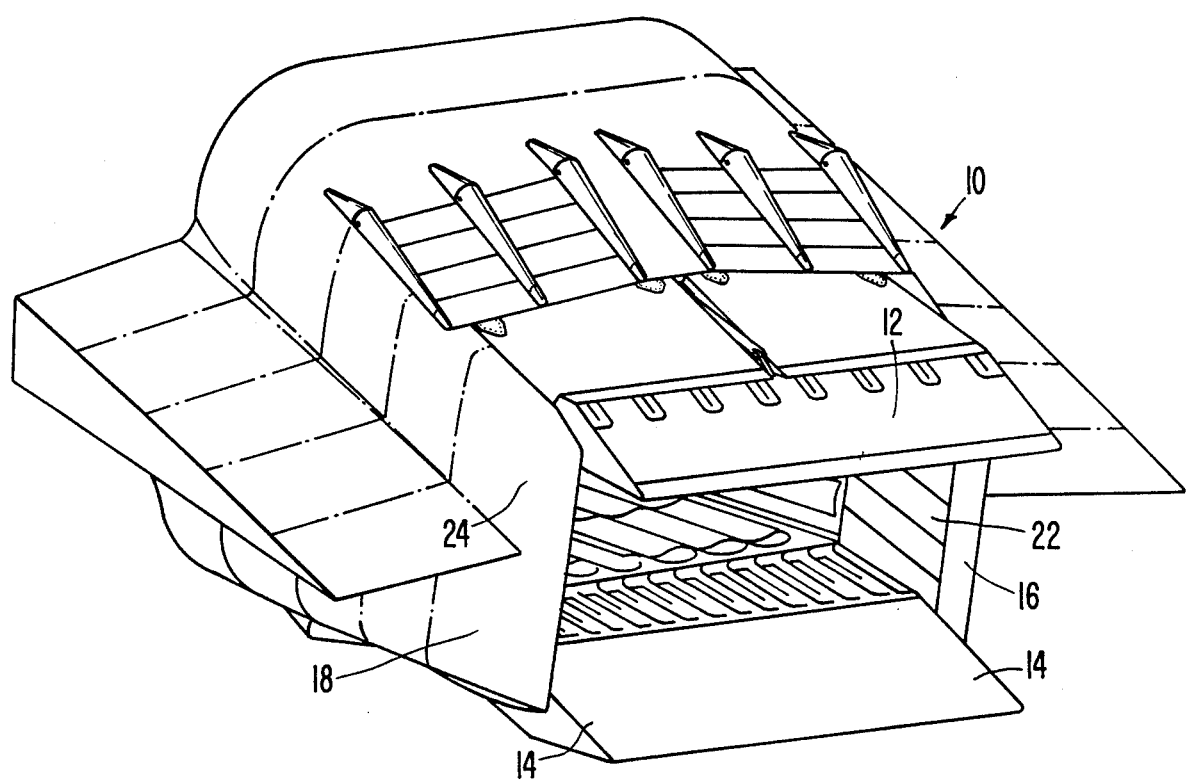
FIG. 2.
(PRIOR ART)
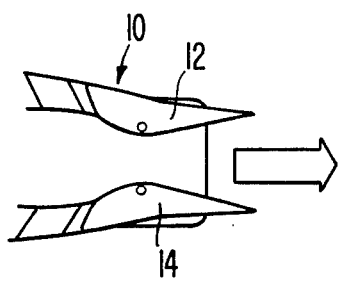
FIG. 3.
(PRIOR ART)
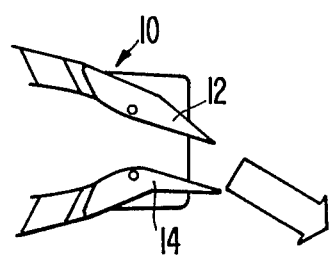
FIG. 4.
(PRIOR ART)
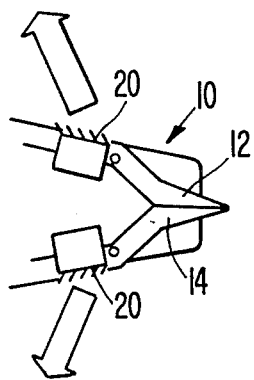

EXHAUST NOZZLE THERMAL DISTORTION CONTROL DEVICE

BACKGROUND OF THE INVENTION

The invention herein described was made in the course of or under a contract, or a subcontract thereunder, with the U.S. Department of the Air Force.

FIELD OF THE INVENTION

The present invention relates to variable area two-dimensional exhaust nozzles, and particularly to a device for controlling thermal distortion of the sidewalls of the nozzle and consequent exhaust gas leakage loss from the nozzle.

DESCRIPTION OF THE RELATED ART

Maneuverability of modern high performance aircraft is greatly enhanced by extending the role of the jet engine exhaust nozzle beyond its conventional jet accelerating function. An exhaust nozzle with jet deflection capability can produce more rapid aircraft maneuvers at lower flight speeds than can be achieved by conventional control surfaces. In addition, reverse thrust capability incorporated into the exhaust nozzle can enable an aircraft to decelerate very rapidly in flight for maneuvering purposes, and for reducing the landing roll for short field operation.

Exhaust nozzles capable of such additional functions are commonly known as multi-function exhaust nozzles. A typical example of such a multi-function exhaust nozzle is shown in FIG. 1. This multi-function exhaust nozzle, generally referred to as 10, has a rectangular cross-section defined by an upper movable flap 12 and a lower movable flap 14 each disposed between stationary sidewalls 16 and 18. Such rectangular cross-section exhaust nozzles are commonly referred to as two-dimensional nozzles and are preferred for multi-function applications since, unlike round section, axisymmetric nozzles, the upper and lower movable flaps 12 and 14 may be actuated differentially as shown in FIGS. 2-4 to thereby deflect the hot combustion gases exiting from the nozzle. In FIG. 2 the movable upper and lower flaps 12 and 14 are fully deflected to produce maximum thrust for cruising or acceleration of the aircraft. FIG. 3 illustrates the positions of the upper and lower movable flaps 12 and 14 for vectoring of the exhaust flow through the nozzle to enhance maneuverability of the aircraft. FIG. 4 illustrates the position of the upper and lower movable flaps in a fully choked Position wherein the exhaust flow through the nozzle is directed into and through thrust reversers 20 to rapidly decelerate the aircraft upon landing.

With continued reference to FIG. 1, it is important that the clearance between the edges of the upper and lower movable flaps 12 and 14 and the inner surface of the sidewalls 16 and 18 be held to an absolute minimum to avoid exhaust gas leakage. In operation, the inner surface 22 of each sidewall 16 and 18 is heated by the hot combustion gases exhausting through the nozzle. These inner surfaces 22 of the sidewalls operate at a considerably higher temperature than the outer surfaces 24 of the sidewalls. Because of this difference in temperature between the inner surface 22 and outer surface 24 of sidewalls 16 and 18 the two surfaces expand differently. The higher temperature inner surface 22 expands more than the cooler temperature outer surface 24 resulting in distortion of the sidewall as illustrated in FIG. 5. In FIG. 5 the distortion of sidewalls 16 and 18 in the hot operating condition is illustrated by the dashed lines, and the cold condition of the sidewalls is illustrated by the solid lines. While the amount of distortion illustrated in FIG. 5 is exaggerated for purposes of example, this distortion can be considerable. For example, in a typical design the sidewall tip 26 may deflect up to 1.8 inches with a 530 F. temperature difference between inner surface 22 and outer surface 24. A variation in sidewall deflection creating a flap clearance of this magnitude results in extreme leakage control problems.

Prior art attempts at controlling or limiting the amount of leakage between the sidewalls and upper and lower flaps of a two-dimensional nozzle have focused on an attempt to fit the sidewalls and movable flaps with a flexible seal or membrane to attempt to accommodate thermal distortion under hot operating conditions. Examples of such flexible seals are described in U.S. Pat. Nos. 4,575,099; 4,093,157 and 4,575,006. The problems encountered with the use of such flexible seals at the abutment between the movable flaps and stationary sidewalls of the exhaust nozzle are that the seals tend to deteriorate under the extreme operating conditions present in a jet engine exhaust nozzle, and that the sliding motion of the seal against the stationary sidewall as the upper and lower movable flaps are adjusted for multi-function purposes results in deterioration of the surfaces of the sidewalls and movable flaps. Such deterioration requires additional maintenance for the nozzle and furthermore contributes to a lessening of the sealing effect. Moreover, seals of this type which have been adapted for multi-function nozzles do not provide a sufficiently tight seal to eliminate exhaust leakage problems.

Therefore, it is an object of the present invention to Provide a means for limiting the thermal distortion of the sidewalls of a two-dimensional multi-function exhaust nozzle to thereby enhance the efficiency of the nozzle by significantly reducing exhaust leakages between the abutments of the sidewalls and upper and lower movable flaps.

It is still a further object of the present invention to control the thermal distortion of the sidewalls of a two-dimensional multi-function exhaust nozzle to control exhaust leakages therefrom without the use of a mechanical assembly which may contribute to physical deterioration of the surface of the exhaust nozzle.

Additional objects and advantages of the invention will be set forth in the description which follows, and in part will be obvious from the description, or may be learned by practice of the invention. The objects and advantages of the invention may be realized and attained by means of the instrumentalities and combinations particularly pointed out in the appended claims.

SUMMARY OF THE INVENTION

To achieve the foregoing objects, and in accordance with the purposes of the invention as embodied and broadly described herein, a variable area two dimensional converging diverging nozzle for exhausting a stream of hot combustion gases from a jet engine comprises upper and lower movable exhaust flaps disposed between stationary side walls for defining at least a portion of the exhaust path of the nozzle, each of the sidewalls having an inner surface and an outer surface. Heat exchange means are disposed on the outer surface of each of the sidewalls for heating the outer surface of each sidewall to reduce the temperature differential between the inner and outer surfaces of the sidewall. A source of hot gas and a means for directing the hot gas into the heat exchange means is further provided.

Preferably, the heat exchange means of the present invention comprises a heat exchange baffle having a plurality of adjacent passages terminating at one end in a plenum. It is further preferred that the directing means includes a plurality of ports extending through the sidewall and communicating with selected ones of the adjacent passages at the outer surface of the sidewall.

It is still further Preferred that each of the plurality of adjacent passages of the baffle of the heat exchange means have an upstream end and a downstream end relative to the flow path of combustion gases through the nozzle, and a substantially semi-cylindrical cross-section with the diameter thereof being contiguous with the outer surface of the sidewall. It is further preferable that the plenum of the baffle be disposed Proximate the upstream ends of the passages and that the Ports of the directing means communicate with alternate ones of the passages at the downstream ends thereof. Hot gas from the hot gas source then passes through the ports of the directing means in a first direction through the alternate ones of the Passages and into the plenum. From the plenum the hot gas passes through the remaining ones of the passages in a second direction opposite the first direction to exit through exit orifices disposed in the downstream ends of the remaining ones of the passages.

It still further Preferred that the source of hot gas for the heat exchange means comprises hot combustion gases exhausting through the nozzle which hot gases are directly channeled into the heat exchange means from a location in the nozzle through the ports of the directing means disposed in the sidewalls. Alternatively, where the nozzle includes a liner plate spaced from the inner surface of the sidewall to define an airflow Passage therebetween through which fan air from the jet engine is directed to cool the inner surface of the sidewall, the hot gas source comprises a portion of the fan air directed through the airflow Passage defined by the liner and the inner surface of the sidewall. The hot fan air is then channeled into the heat exchange means through the ports of the directing means disposed in the sidewalls of the nozzle.

BRIEF DESCRIPTION OF THE DRAWINGS

The accompanying drawings, which are incorporated in and constitute a part of the specification, illustrate a preferred embodiment of the invention and, together with the general description given above and the detailed description of the preferred embodiment given below, serve to explain the principles of the invention.

FIG. 1 is an isometric view of a conventional two-dimensional multi-function exhaust nozzle;

FIGS. 2-4 illustrate various positions of the upper and lower flaps of the two-dimensional multi-function exhaust nozzle of FIG. 1 which positions correspond to various portions of the flight envelope of the aircraft;

DESCRIPTION OF THE EMBODIMENT

Figure 5:
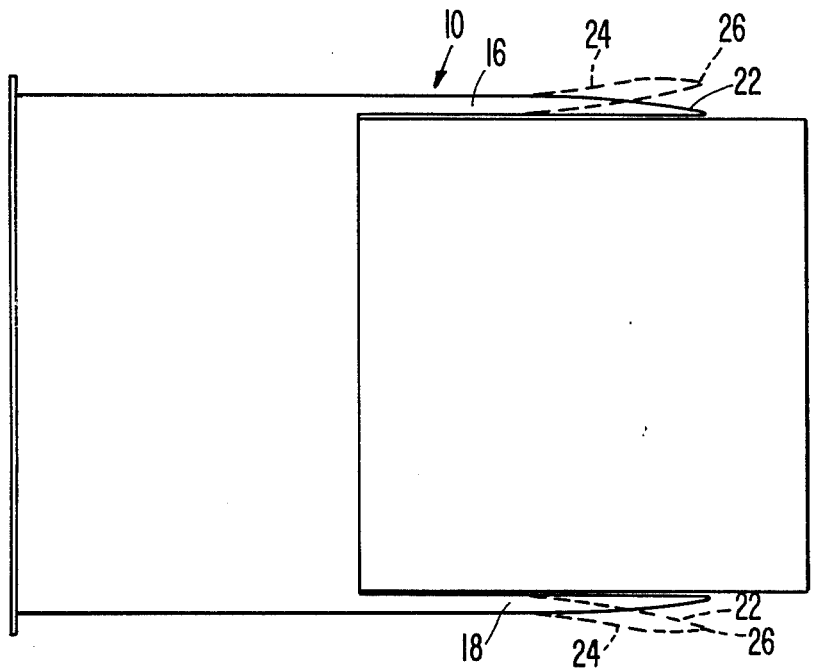
FIG. 5 is a sectional plan view of the two-dimensional multi-function exhaust nozzle of FIG. 1 illustrating the effects of thermal distortion on the sidewalls of the nozzle.

Reference will now be made in detail to the present preferred embodiment of the invention as illustrated in the accompanying drawings wherein like reference numerals refer to like elements throughout.

Figure 6:
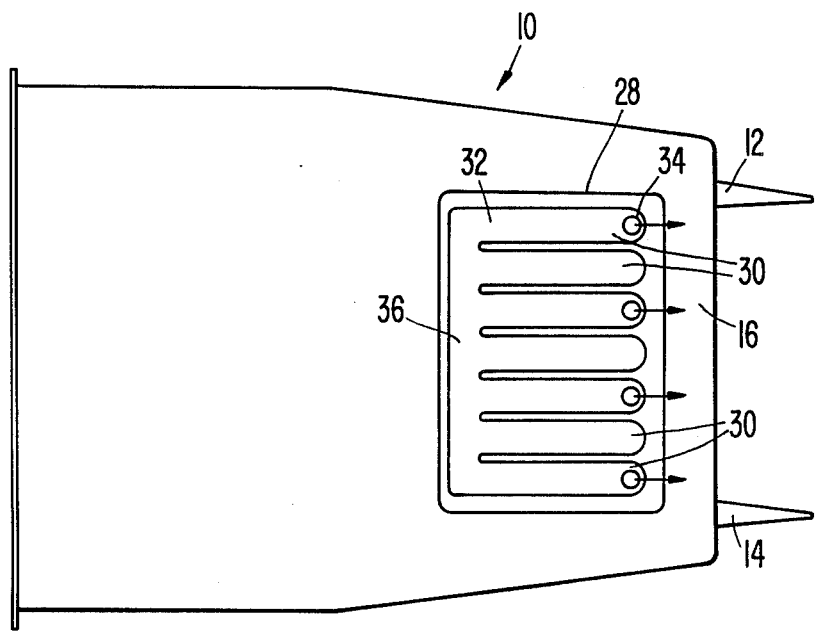
FIG. 6 is an elevation view of a two-dimensional multi- function exhaust nozzle incorporating the teachings of the present invention.
Figure 8:
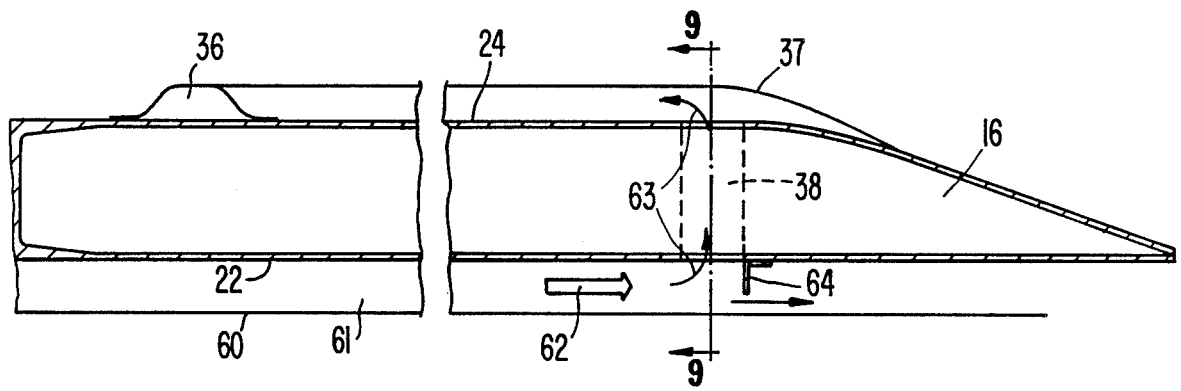
FIG. 8 is a sectional elevation view of the nozzle sidewall incorporating the teachings of the present invention.

In accordance with the Present invention and with reference to FIG. 6, the variable area two-dimensional converging diverging nozzle for exhausting a stream of hot combustion gases from a jet engine is generally referred to as 10. As embodied herein, the exhaust nozzle 10 includes upper and lower movable exhaust flaps 12 and 14, respectively, disposed between stationary sidewalls 16 and 18 for defining at least a portion of the exhaust path of the nozzle. Each sidewall 16 and 18 has a honeycombed core and an inner surface 22 and an outer surface 24 as illustrated in FIG. 8.

In accordance with the present invention the nozzle includes heat exchange means, disposed on the outer surface of each sidewall, for heating the outer surface of each sidewall to reduce the temperature differential between the inner and outer surfaces of the sidewall during operation of the nozzle. As embodied herein, the heat exchange means comprises heat exchange baffles 28 each mounted on outer surfaces 24 of a respective one of sidewalls 16 and 18, and each having a plurality of adjacent passages 30. Each passage 30 has an upstream end 32 and a downstream end 34 relative to the exhaust flow path of the combustion gases through nozzle 10. Baffle 28 further includes a plenum 36 positioned adjacent upstream ends 32 of passages 30. To minimize drag and maintain the aerodynamic efficiency of nozzle 10, a cover plate 37 may be placed over baffle 28.

The exhaust nozzle incorporating the teachings of the Present invention further comprises a source of hot gas and means for directing the hot gas into the heat exchange means. As embodied herein and illustrated in FIGS. 7 and 8, the directing means comprises ports 38 extending through sidewalls 16 and 18 between inner surface 22 and outer surface 24 thereof. Inlet ports 38 communicate with alternate ones of passages 30 at inner surface 24 of the respective sidewall. The remaining ones of passages 30 are configured with exit orifices 40 proximate downstream ends 34 thereof.

Figure 9:
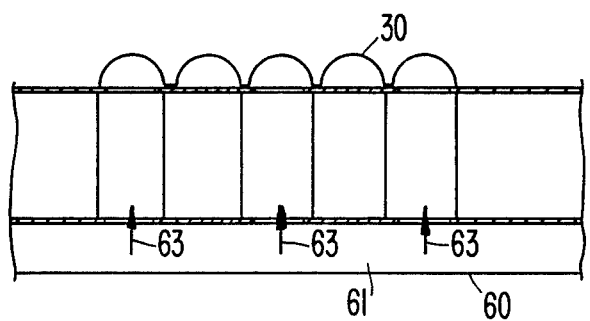
FIG. 9 is a view of the sidewall of FIG. 8 taken along the line 9—9.
Figure 10:
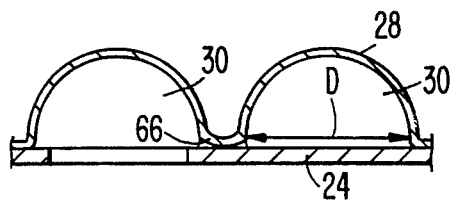
FIG. 10 is a detailed view of the semi-cylindrical passages of the heat exchange means of the present invention illustrating one means of attachment of the heat exchange means to the outer surface of the sidewall.

As illustrated in FIGS. 9 and 10 each passage 30 preferably has a substantially semi-cylindrical cross-section with a diameter D thereof being contiguous with outer surface 24 of the respective one of sidewalls 16, 18. While the cross-section of passages 30 of baffle 28 is not limited to being semi-cylindrical as illustrated in the drawings, such a configuration provides an efficient, tension-loaded, low weight baffle design able to withstand the distortion of the material comprising the passages 30 as it is cycled between the high operating temperatures of the exhaust nozzle and the cold downstate of the engine. Moreover, the width and length of passages 30 may be varied in accordance with the nozzle geometry.

Figure 7:
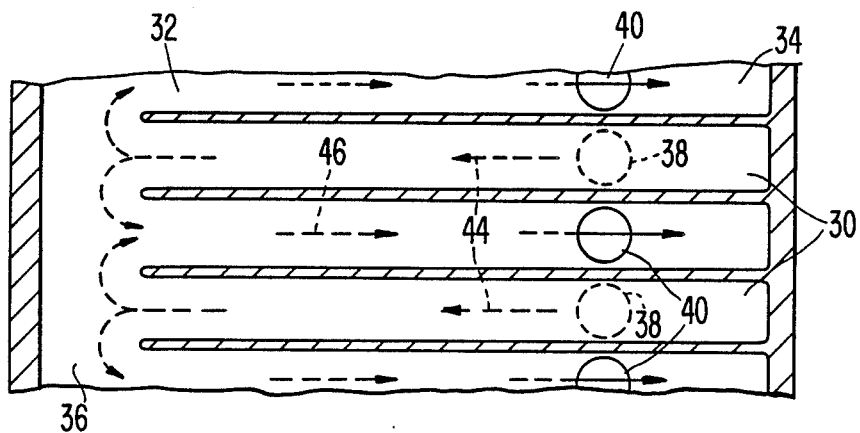
FIG. 7 is a partial cutaway view of the heat exchange baffle disposed on the outer surface of the sidewalls of the nozzle of FIG. 6.

With reference to FIG. 7, hot gas is directed through ports 38 of the directing means into alternate ones of passages 30 and moves in a first direction 44 through the alternate passages towards plenum 36. From plenum 36 the hot gas is directed in a second direction 46 opposite first direction 44 through the remaining ones of passages 30 and exits through exit orifices 40 proximate downstream ends 34 of passages 30. Thus, the baffle comprising the heat exchange means of the Preferred embodiment of the present invention comprises a two pass serpentine type heat exchange baffle wherein hot air flows forward through alternate ones of passages 30 in direction 44 heating sidewall outer surface 24, and then reverses direction in plenum 36 and flows rearwardly in direction 46 again heating outer surface 24 of sidewall 16. Finally, the hot gas, having heated outer surface 24, is discharged through exit orifices 40 to the atmosphere. In this manner, outer surface 24 is heated to reduce the temperature differential between the inner surface 22 and outer surface 24 of the sidewalls thus minimizing the thermal distortion of the sidewall since the thermal distortion is proportional to the temperature gradient across the sidewall.

In accordance with the invention, the source of hot gas for the heat exchange means may comprise the hot combustion gases being exhausted through nozzle 10 in the instance where inner surface 22 is directly exposed to the hot combustion gases. The hot combustion gases are thus channeled directly into baffle 28 through ports 38 of the directing means.

In other instances, as illustrated in FIG. 8, where nozzle 10 includes a liner 60 spaced from inner surface 22 of sidewalls 16 and 18 to define an airflow passage 61 therebetween, fan air from the jet engine, which is cooler than the hot combustion gases, is directed through the airflow passage defined by inner surface 22 and liner 60 in a direction indicated by arrows 62. This cooler fan air picks up heat across liners 60 from the hot combustion gases exiting through the exhaust nozzle and is directed through ports 38 and into heat exchange baffle 28 as shown by the arrows 63.

In the instance where the nozzle includes liner 60 and the source of hot gas is fan air flowing in airflow Passage 61 between liner 60 and inner surface 22, ports 38 of the directing means are preferably positioned close to the downstream end of sidewalls 16 and 18 such that fan air directed through airflow passage 61 picks up sufficient heat from the hot combustion gases in the exhaust nozzle through liner 60 to significantly heat outer surface 24 of the sidewall as the hot fan air is directed through heat exchange baffle 28.

Where the source of hot gas is fan air flowing through airflow passage 61, a flow restrictor 64 may be attached to inner surface 22 in airflow passage 61 immediately downstream of ports 38 to increase fan air pressure at the entrance of ports 38 on inner surface 22 of the sidewall thereby forcing air into passages 30 of heat exchange baffle 28. Such a flow restrictor may be necessary where inlet ports 38 are disposed proximate the downstream end of the sidewalls where the pressure of the fan air at the entrance to ports 38 is not sufficient to force hot gas through heat exchange baffle 28.

With reference to FIG. 10 heat exchange baffle 28 may be attached to outer surface 24 of the sidewall by any convenient means. For example, the adjacent semi-cylindrical passages 30 may be brazed to outer surface 24 at a portion 66 of baffle 28 connecting adjacent ones of passages 30. One skilled in the art would quickly recognize numerous other means for attaching baffle 28 to outer surface 24 without departing from the spirit or scope of the present invention.

Finally, although baffle 28 has been described herein as a two-Pass, serpentine type heat exchanger, the heat exchange means is not limited thereto and any desired configuration of baffle 28 may be employed provided the configuration would supply variations sufficient to heat outer surface 24 of sidewalls 16, 18.

Additional variations and modifications will readily occur to those skilled in the art. The invention in its broader aspects is, therefore, not limited to the specific details, representative apparatus, and illustrative examples shown and described. Accordingly, departures may be made from such details without departing from the spirit or scope of applicants' general inventive concept.

What is claimed is:

1. A variable area two-dimensional nozzle for exhausting a stream of hot combustion gases from a jet engine, comprising:
   upper and lower movable exhaust flaps disposed between stationary side walls for defining at least a portion of the exhaust path of the nozzle, each said sidewall having an inner surface and an outer surface;
   heat exchange means, disposed on said outer surface of each said sidewall, for heating said outer surface of each said sidewall to reduce the temperature differential between said inner and outer surfaces; and
   a source of hot gas and means for directing said hot gas into said heat exchange means.

2. The nozzle of claim 1, wherein said heat exchange means comprises a Pair of heat exchange baffles each having a Plurality of adjacent passages terminating at one end in a plenum, and wherein said directing means includes a plurality of ports extending through each of said sidewalls and communicating with selected ones of said adjacent passages of the respective one of said baffles at said outer surface of said sidewall.

3. The nozzle of claim 2, including a cover plate spaced from said outer surface of said sidewall and covering said heat exchange baffle.

4. The nozzle of claim 2, wherein each said passage has a substantially semi-cylindrical cross-section with the diameter thereof being contiguous with said outer surface of said sidewall.

5. The nozzle of claim 2, wherein said adjacent passages of each of said baffles are aligned relative to the nozzle to have an upstream end and a downstream end relative to the flow Path of combustion gases through the nozzle.

6. The nozzle of claim 5, wherein said ports of said directing means communicate with alternate ones of said passages of each said baffle.

7. The nozzle of claim 5, wherein each of said baffles includes a plurality of exit orifices, communicating with atmosphere, disposed in those adjacent passages not communicating with said ports of said directing means.

8. The nozzle of claim 7, wherein said plenum of each said baffle is disposed proximate said upstream ends of said passages, and said exit orifices and said ports are disposed proximate said downstream end of respective ones of said passages, wherein hot gas from said hot gas source passes through said ports and in a first direction through said alternate ones of said passages into said plenum and from said plenum through the remaining ones of said passages in a second direction opposite said first direction to exit through said exit orifices.

9. The nozzle of claim 2, wherein said ports of said directing means communicate with the exhaust path of the nozzle at said inner surface of said sidewalls, and said source of hot gas is the hot combustion gases being exhausted from said jet engine through the nozzle.

10. The nozzle of claim 2, further including a liner spaced from said inner surface of said sidewall to define an air flow passage therebetween for directing fan air from said jet engine along said inner surfaces of said sidewall, said ports of said directing means communicating with said air flow passage at said inner surface of said sidewall, and wherein said fan air flowing in said air flow passage comprises said source of hot gas.

11. The nozzle of claim 10, including means for channeling said fan air from said air flow passage into said ports of said sidewall.

12. The nozzle of claim 10, wherein said channeling means includes a flow restrictor positioned in said airflow passage downstream from said ports to increase the fan air pressure at the entrance to said ports.

13. The nozzle of claim 2, wherein each said passage of said baffle is spaced from its adjacent passages by a flat portion contiguous with said outer surface of said sidewall, said baffle being attached to said outer surface by brazing said flat portions to said outer surfaces.

* * * * *